(12) United States Patent
Maeda

(10) Patent No.: US 8,543,371 B2
(45) Date of Patent: Sep. 24, 2013

(54) WRITE-PROTECTED STORAGE MEDIUM, WRITE-PROTECTED APPARATUS, AND WRITE-PROTECTED ENVIRONMENT

(75) Inventor: Munenori Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 12/409,136

(22) Filed: Mar. 23, 2009

(65) Prior Publication Data

US 2009/0292522 A1 Nov. 26, 2009

(30) Foreign Application Priority Data

May 22, 2008 (JP) ................................. 2008-134527

(51) Int. Cl.
*G06F 9/455* (2006.01)
(52) U.S. Cl.
USPC .......................................................... 703/23
(58) Field of Classification Search
USPC .............. 703/23, 27; 711/E12.091, E12.001, 711/209, 202, 163, 213; 714/E11.177
See application file for complete search history.

(56) References Cited

U.S. PATENT DOCUMENTS

| 5,758,124 A | * | 5/1998 | Ogata et al. ...................... 703/27 |
| 7,886,148 B2 | * | 2/2011 | Kiriansky et al. ............. 713/166 |
| 2008/0140971 A1 | * | 6/2008 | Dankel et al. .................. 711/163 |
| 2008/0216073 A1 | * | 9/2008 | Yates et al. ..................... 718/100 |

FOREIGN PATENT DOCUMENTS

| JP | 2002-536712 | 10/2002 |
| JP | 2002-543490 | 12/2002 |
| JP | 2006-524382 | 10/2006 |
| WO | WO 00/45257 | 8/2000 |
| WO | WO 00/65440 | 11/2000 |
| WO | WO 2004/095264 | 11/2004 |

\* cited by examiner

*Primary Examiner* — David Silver
*Assistant Examiner* — Andre Pierre Louis
(74) *Attorney, Agent, or Firm* — Greer, Burns & Crain, Ltd.

(57) ABSTRACT

An emulation apparatus includes a translator, a first memory map, a second memory map, and a rewriting unit. The translator translates an instruction output from the target program to an instruction executable by the emulation apparatus. The first memory map is located in a memory region for use by the target program and is write-protected based on operation environment of the emulation apparatus. The second memory map is write-protected based on at least one of the execution environment of the target program and content of the instruction from the target program. The rewriting unit rewrites a first write instruction output from the translator to a second write instruction to the second memory map when the first write instruction causes a write protection violation to the first memory map.

7 Claims, 9 Drawing Sheets

MEMORY ON TARGET MACHINE

MEMORY ON TARGET MACHINE

FIG.6

```
DEFINITION OF CHECK_WRITE(ADDR, VAL) ::
 1:if (PAGE(ADDR)==U) {
 2:   if (NOT PROTECTED_RANGE(ADDR)) {
 3:     WRITE(OFFSET+ADDR, VAL);
 4:   } else {
 5:       //WRITEX BELOW CAUSES EXCEPTION DUE TO
             MEMORY PROTECTION VIOLATION
 6:     WRITEX(ADDR, VAL);
 7:   }
 8:} else {
 9:   //ALTERNATIVE PAGE U IS NOT PROVIDED
10://WRITE IN WRITE-PROTECTED REGION.  FOLLOW POLICY FOR EACH
      PROTECTED REGION, SUCH AS TRANSPOSITION OF TLB
11://TARGETED FOR RECURSIVE INSTRUCTION REWRITE.  IF RECURSIVE
      REWRITE IS DESIRED TO BE AVOIDED, USE WRITEX(ADDR, VAL)
12:   WRITE(ADDR, VAL);
13: }
```

FIG.7

```
DEFINITION OF CHECK_WRITE(ADDR, VAL) ::
 1:if (PAGE(ADDR)==U1) {
 2:   if (NOT PROTECTED_RANGE(ADDR)) {
 3:     WRITE(OFFSET+ADDR, VAL);
 4:   } else {
 5:     WRITEX(ADDR, VAL);
 6:   }
 7:} else {
 8:   if (PAGE(ADDR)==U2) {
 9:     if (NOT PROTECTED_RANGE(ADDR)) {
10:       WRITE(OFFSET+ADDR, VAL);
11:     } else {
12:       WRITEX(ADDR, VAL);
13:     }
14:   } else {
15:     WRITE(ADDR, VAL);
16:   }
17: }
```

FIG.8

```
1:if (PAGE(ADDR)==U1) {
2:   if (NOT PROTECTED_RANGE(ADDR)) {
3:     WRITE(OFFSET+ADDR, VAL);
4:   } else {
5:     WRITEX(ADDR, VAL);
6:   }
7:} else {
8:   if (PAGE(ADDR)==U2) {
9:     if (NOT PROTECTED_RANGE(ADDR)) {
10:       WRITE(OFFSET+ADDR, VAL);
11:     } else {
12:       WRITEX(ADDR, VAL);
13:     }
14:   } else {
15:     if (PAGE(ADDR)==U3) {
16:       if (NOT PROTECTED_RANGE(ADDR)) {
17:         WRITE(OFFSET+ADDR, VAL);
18:       } else {
19:         WRITEX(ADDR, VAL);
20:       }
21:     } else {
22:       WRITE(ADDR, VAL);
23:     }
24:   }
25: }
```

FIG.9

```
1:if (CHECK WITH FUNCTION OR OTHERS TO
     SEE WHETHER ADDR IS ON PROTECTED PAGE) {
2:   if (NOT PROTECTED_RANGE(ADDR)) {
3:     WRITE(OFFSET+ADDR, VAL);
4:   } else {
5:         // WRITEX BELOW CAUSES EXCEPTION DUE TO
              MEMORY PROTECTION VIOLATION
6:     WRITEX(ADDR, VAL);
7:   }
8:} else {
9:   WRITE(ADDR, VAL);
10: }
```

US 8,543,371 B2

WRITE-PROTECTED STORAGE MEDIUM, WRITE-PROTECTED APPARATUS, AND WRITE-PROTECTED ENVIRONMENT

CROSS-REFERENCE TO RELATED APPLICATION

This application is based upon and claims the benefit of priority of the prior Japanese Patent Application No. 2008-134527, filed on May 22, 2008, the entire contents of which are incorporated herein by reference.

FIELD

The embodiment discussed herein is directed to an emulation apparatus, an emulation method, and a computer product for virtually providing an execution environment of a program.

BACKGROUND

An emulation program and an emulation apparatus execute a target instruction, which is a bunch of instructions output from a target program, on a virtual computing machine (see, for example, Japanese translation No. 2002-543490 of PCT international application). In the following explanation, any of an emulation apparatus and a computer functioning as an emulation apparatus by execution of an emulation program is referred to as a host machine. Similarly, a set of a virtual computing machine provided through emulation and a target program operating on the virtual computing machine is referred to as a target machine.

An emulation program or an emulation apparatus is generally formed of an instruction interpreter that interprets and executes a target instruction stream and an instruction translating mechanism for translation to a host instruction at the time of execution (see, for example, Japanese translation Nos. 2002-536712 and 2006-524382 of PCT international application).

The instruction translating mechanism has a function similar to that of a conventional compiler in translating target instructions into host instructions, but is different from the conventional compiler in that the translating process is dynamic, that is, the translating process is performed at the time of executing a target program for emulation, and therefore information of the target program collectable at the time of executing the translating process can be utilized. Hereinafter, a bunch of host instructions dynamically generated by the instruction translating mechanism from the target instructions is referred to as a translation code (codelet).

The codelet is placed in a different memory region from one that emulates the target machine memory, and can be freely changed through an operation of the instruction translating mechanism or a virtual processor as long as validity of execution is ensured. This is because the codelet is considered similarly as invisible microcode in an instruction cache.

On the other hand, unlike the codelet, it is generally not allowed for the emulation program to arbitrarily rewrite data or instructions on a real memory space and a virtual memory space of the target machine. This is because it is impossible to determine such memory rewriting processes and utilities running on the target machine that refer to the rewritten memory.

In one technology, to allow a virtual memory on the target machine to be efficiently accessed from the host machine, an address translating mechanism, or Translation Lookaside Buffer (TLB), of the host machine is used to directly translate a virtual address (or a real address) of the target machine to a virtual address of the host machine. In recent years, such a technology is incorporated in many pieces of emulation software.

By using the hardware TLB of the host machine, an access overhead to the virtual memory of the target machine can be reduced significantly, comparing with using software address translation (except when TLB miss exception or page exception occurs).

In a page write-protecting method, a page attribute of the target memory is set as non-writable on the corresponding host memory. When a write in the target memory occurs, the write is detected by the host hardware and examined whether it is performed on target memory using a coordinated exception handler.

However, if such a page write-protecting method is taken, significant overheads may occur in writing not only in the region to be originally protected but also in other regions.

For example, in a low-address protection mechanism adopted by part of computers, write protection works for writing in addresses in a range of 0 to 511, while these machines support only limited page sizes: 2KB or larger. Writes in addresses of 512 onward on the same page may be occurred as many as those on other pages.

When a target machine supporting low-address protection is emulated by a host machine not supporting low-address protection but using page write protection, write protection is required to be performed also for the addresses of 512 onward on the same page to replicate low-address protection. Therefore, compared with the original execution environment of the target machine, write protection violations increase.

Moreover, there is another problem of ensuring coherency of instruction. Several methods of ensuring coherency of codelets and corresponding target instructions have been known. One of such ensuring methods is a write protection method based on a page write protection method.

In the write protection method based on the page write protection method, a memory page including target instructions associated with codelet is set to a write protection attribute. When a write is performed in the protected page, any codelet for the target instruction in this page becomes invalid, or a particular codelet becomes invalid after examined each validity individually. Since protection is performed in units of pages, the write protection mechanism works even in writing in data addresses on the same page that are not included in the target instructions.

When a write protection violation is detected by the host machine, an exception handler of a host operating system (OS) kernel or an emulation program is started. The exception handler checks to see whether this write is targeted for a region to be originally protected. If this write is targeted for a region not to be exactly protected, the exception handler operates the TLB of the host processor to invalidate write protection to allow the write in the memory. Then, the exception handler again operates the TLB of the host processor to validate write protection.

Compared with the original write instruction, the privileged operation of the host TLB by execution of the exception handler is extremely slow due to significant overheads. However, such overheads occur only for a store instruction causing a protection violation.

An instruction interpreter can be used for write protection without using the page write protecting function of the host machine. However, in write protection with the instruction interpreter, whether a write address is within a protected region has to be determined for all store instructions included in a bunch of target instructions. This causes overheads for almost all store instructions regardless of the presence or absence of a protection violation, meaning that the entire performance is degraded in proportion to the number of times of execution of store instructions.

That is, in the conventional technology, when a virtual execution environment is provided to a target program, memory protection and high-speed access are not mutually compatible.

SUMMARY

According to an aspect of the invention, an emulation apparatus for virtually providing execution environment of a target program, includes: a translator that translates an instruction output from the target program to an instruction executable by the emulation apparatus; a first memory map, in a memory region for use by the target program, that is write-protected based on operation environment of the emulation apparatus; a second memory map that is write-protected based on at least one of the execution environment of the target program and content of the instruction from the target program; and a rewriting unit that rewrites a first write instruction output from the translator to a second write instruction to the second memory map when the first write instruction causes a write protection violation to the first memory map.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 is an example schematic diagram for explaining definition of CHECK_WRITE (ADDR, VAL);

FIG. 7 is an example schematic diagram for explaining recursive rewrite of CHECK_WRITE;

FIG. 8 is another example schematic diagram for explaining recursive rewrite of CHECK_WRITE;

FIG. 9 is an example schematic diagram for explaining definition of CHECK_WRITE avoiding recursive rewrite;

DESCRIPTION OF EMBODIMENT

Preferred embodiments of the present invention will be explained with reference to accompanying drawings.

Figure 1:
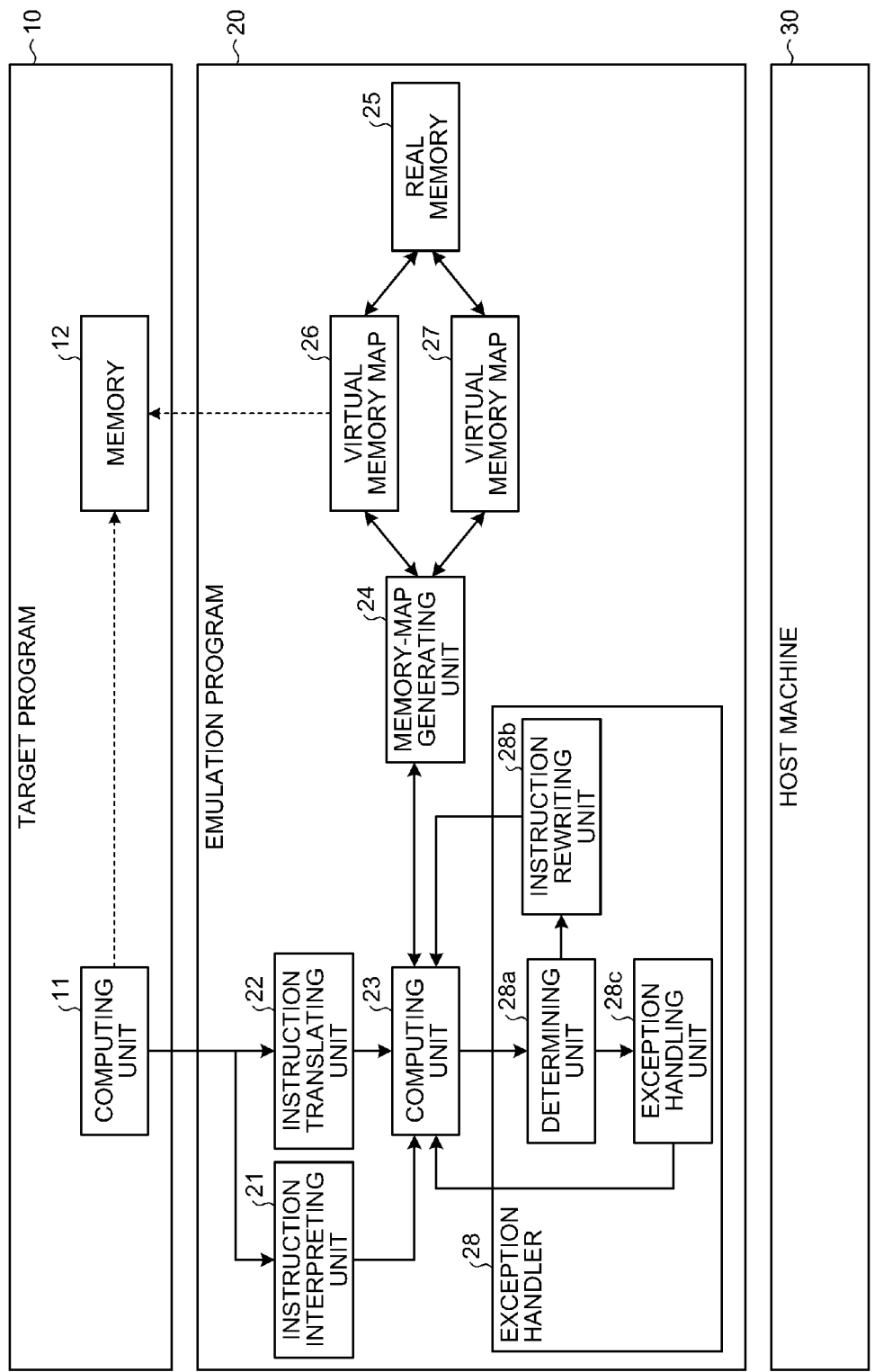
FIG. 1 is an example schematic diagram for explaining the configuration of an emulation program according to an embodiment.

FIG. 1 is a schematic diagram for explaining the configuration of an emulation program according to an embodiment. The emulation program 20 depicted in FIG. 1 operates by using hardware of a host machine 30, providing a virtual execution environment to a target program 10. For this reason, from the target program 10, the emulation program 20 is recognized as a computing machine including an original execution environment.

The target program 10 operates to perform a computing process by a computing unit 11 on a virtual computing machine provided by the emulation program 20 and to use a memory 12 for reading and writing the computation results.

In practice, a target instruction output from the computing unit 11 is processed by the emulation program 20. The memory 12 is a mapping of a memory managed by the emulation program 20.

The emulation program 20 includes an instruction interpreting unit 21, an instruction translating unit 22, a computing unit 23, a memory-map generating unit 24, a real memory 25, virtual memory maps 26 and 27, and an exception handler 28.

The instruction interpreting unit 21 interprets a target instruction output from the target program 10. The instruction translating unit 22 is a mechanism that translates the target instruction output from the target program 10 to a host instruction at the time of execution.

The instruction interpreted by the instruction interpreting unit 21 and the host instruction generated by the instruction translating unit 22 are executed by the computing unit 23. The computing unit 23 writes the computation results in the real memory 25 via the memory-map generating unit 24 and the virtual memory maps 26 and 27, and obtains the contents of the real memory 25 via the memory-map generating unit 24 and the virtual memory maps 26 and 27 for use in computation.

The memory-map generating unit 24 intervenes in access to the real memory 25 by the computing unit 23, and generates the virtual memory maps 26 and 27 as memory maps for the real memory 25.

The virtual memory map 26 corresponds to the memory 12 in the target program 10, and is a memory map write-protected based on the execution environment of the emulation program 20, that is, the functions of the host machine 30. Specifically, the virtual memory map 26 is write-protected in units of pages.

The virtual memory map 27 is a memory map write-protected based on the original execution environment of the target program 10 and the code of the target program. Specifically, the virtual memory map 27 has contents identical to those of the virtual memory map 26, with addresses being shifted by a predetermined amount. Since write protection of the virtual memory map 27 is performed in a software manner, no restrictions are imposed by the execution environment of the host machine 30, and a protected address is determined in view of the operation of the target program 10, specifically, in view of low-address protection and ensuring coherency among instructions.

The exception handler 28 is called when a write protection violation to the memory occurs as a result of computation by the computing unit 23, and includes a determining unit 28a, an instruction rewriting unit 28b, and an exception handling unit 28c.

The emulation program 20 has a plurality of store instructions for writing in the memory. The determining unit 28a determinates the type of a store instruction causing a write violation, and sends the store instruction to either one of the instruction rewriting unit 28b and the exception handling unit 28c based on the determination result.

The exception handling unit 28c performs normal exception handling, and returns the process to the computing unit 23 after exception handling. On the other hand, the instruction rewriting unit 28*b* rewrites the store instruction, and then returns the process to the computing unit 23. Details of the process by this instruction rewriting unit 28*b* will be explained further below.

Figure 2:
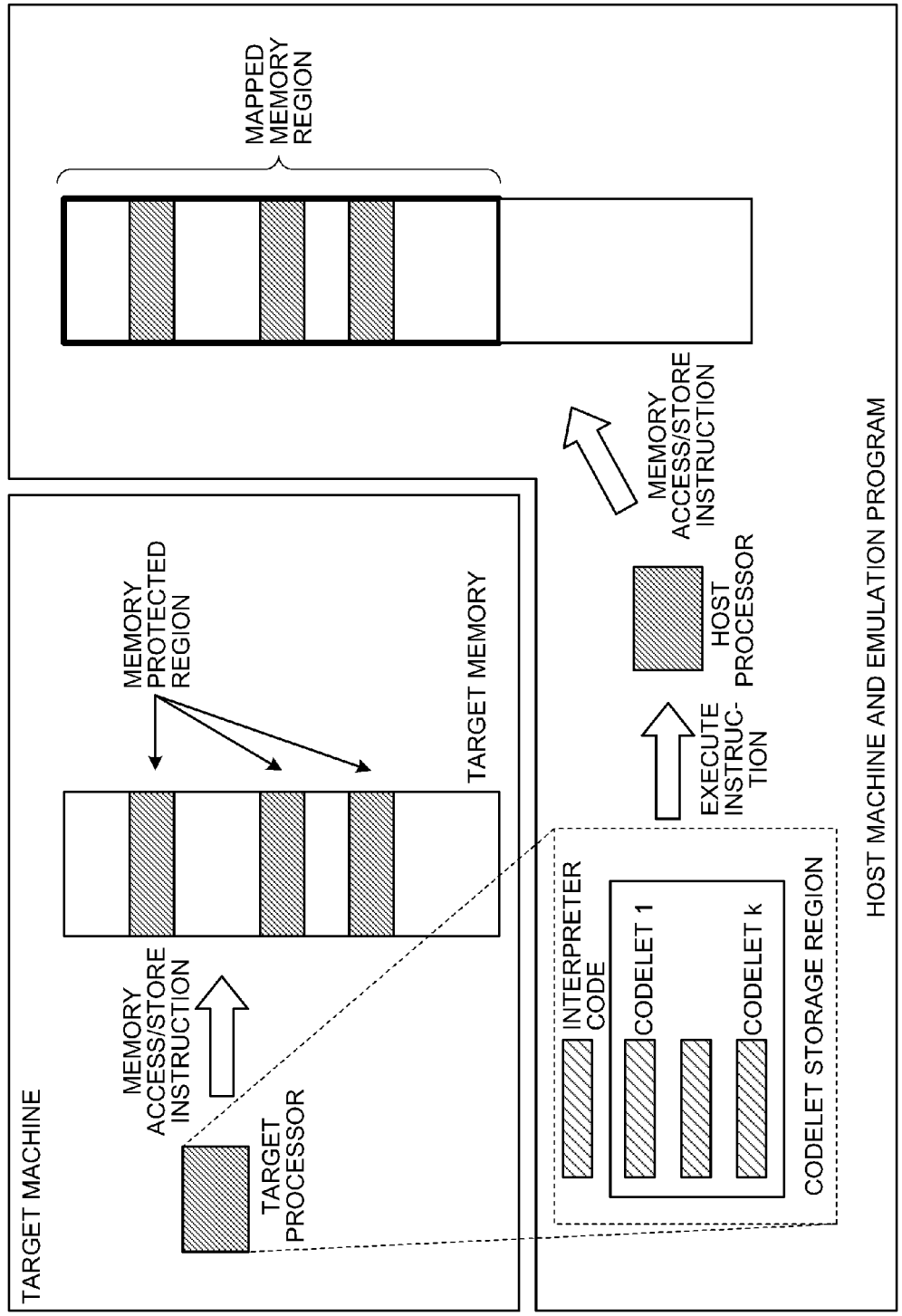
FIG. 2 is an example schematic diagram for explaining an emulation operation.

FIG. 2 is a schematic diagram for explaining an emulation operation. In the target machine, a target processor executing computation executes a store instruction, and then the execution results are reflected in the target memory.

In practice, the operation of the target processor and the management of the memory are performed by the host machine 30 and the emulation program 20. That is, the instruction from the target processor is interpreted by the instruction interpreting unit 21 as a part of an interpreter code, or is translated by the instruction translating unit 22 as a part of a codelet.

The interpreter code and the codelet are executed by the processor of the host machine, and stored in the memory of the host machine. At the time of accessing the target the memory, in order are efficient and to enable access of the virtual memory on a target machine with a host machine, a memory region of the target memory is mapped to the host memory for storage.

Specifically, a virtual address (or a real address) of the target machine is directly translated to a virtual address of the host machine by using the TLB of the host machine. An access to the virtual memory of the target machine can be achieved with the TLB of the host machine, with minimum possible dynamic address translation on the target machine being performed by software.

Figure 3:
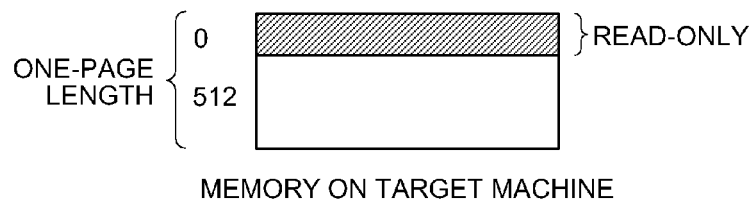
FIG. 3 is an example schematic diagram for explaining low-address protection.

Memory protection on the target memory does not take the execution environment of the host machine into consideration. For example, when the target machine performs low-address protection, as depicted in FIG. 3, the target machine write-protects addresses of the memory in the range of 0 to 511 as read-only. In the original execution environment of the target machine, addresses of 512 onward on the same page can be accessed with the range of addresses from 0 to 511 of the memory being protected.

However, if the host machine does not support low-address protection, to allow the host machine to emulate low-address protection to protect the addresses of the memory in the range of 0 to 511, the entire page has to be write-protected. For this reason, if the host machine tries to write to any of addresses of 512 onward on the same page, a write protection violation occurs.

Figure 4:
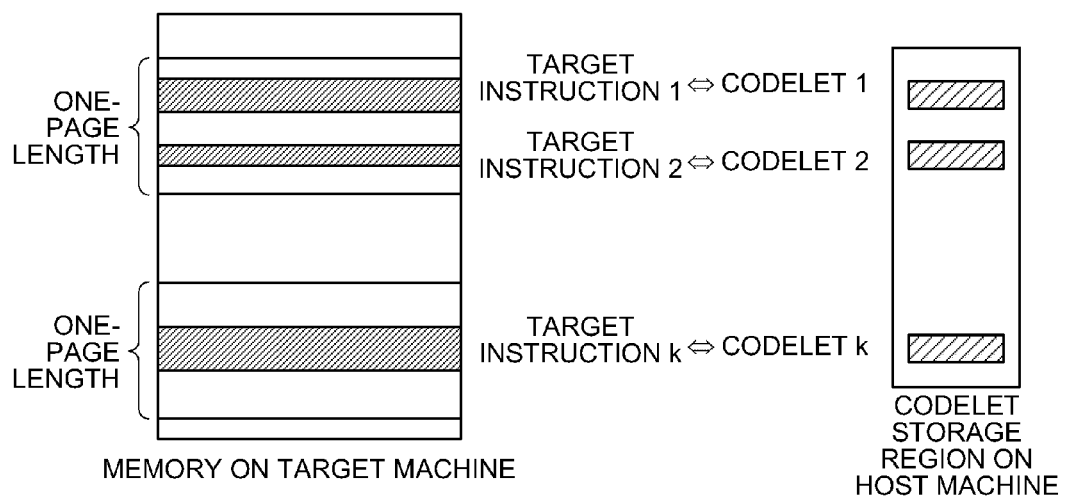
FIG. 4 is an example schematic diagram for explaining how to ensure coherency of codelets and target instructions.

As depicted in FIG. 4, in the page write protection method, a memory page including a bunch of target instructions is set to a write protection attribute. When a write is performed in the memory page including the bunch of target instructions, a codelet for the target instruction in that page is invalidated, thereby ensuring coherency of the codelet and the target instruction.

Since the page write protection method is performed in units of pages, the write protection mechanism works even in writing in data addresses on the same page that are not included in the bunch of target instructions, thereby causing a write protection violation.

In view of these facts, in the emulation program 20, write protection independent from the execution environment of the host machine is achieved by copying a virtual address space and rewriting a store instruction.

Figure 5:
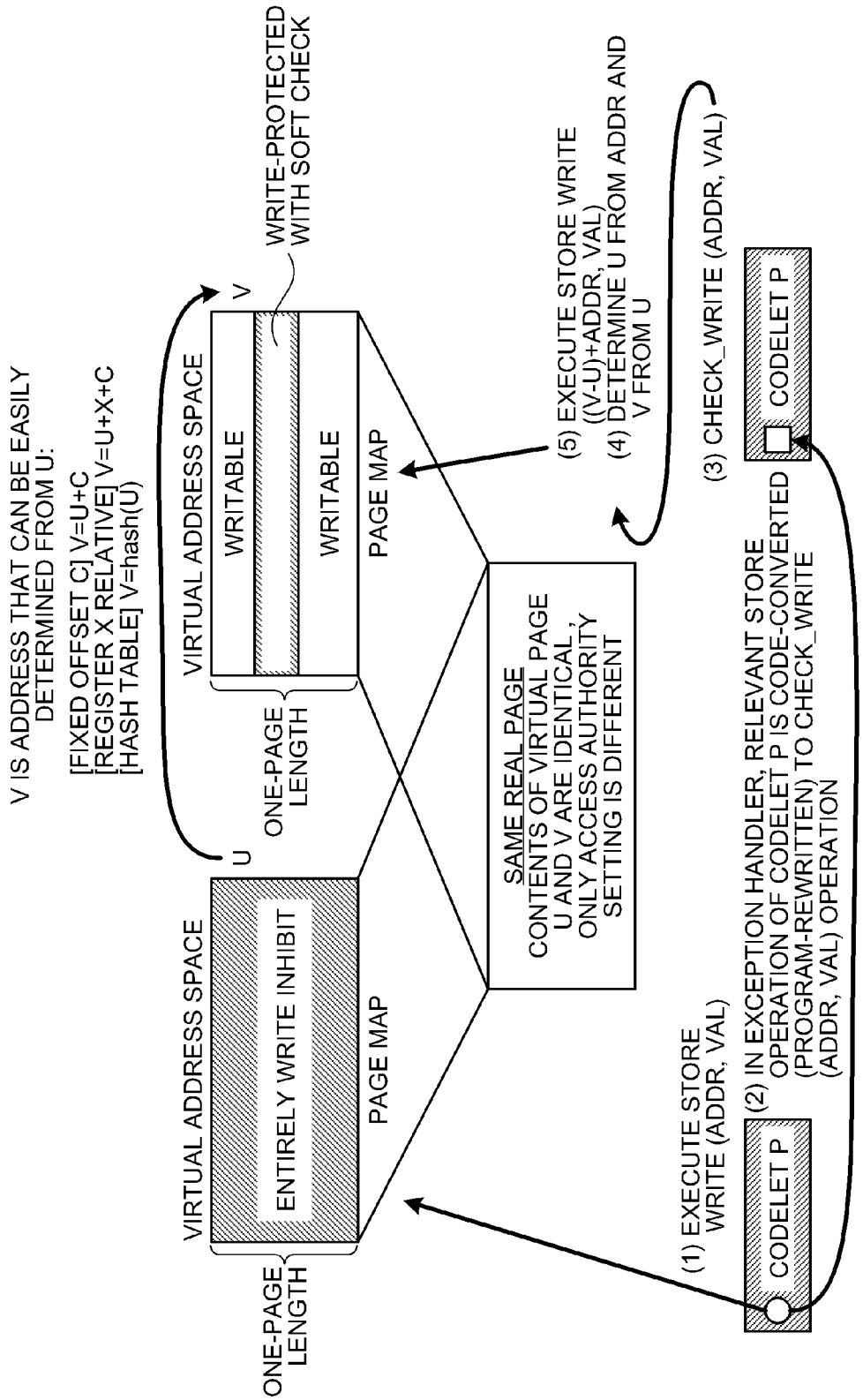
FIG. 5 is an example schematic diagram for explaining write protection in an emulation program.

FIG. 5 is a schematic diagram for explaining write protection in the emulation program 20. First, preparation in advance will be described. To a page U requiring write protection, a page V not write-protected is provided. The page U requiring write protection is provided from the virtual memory map 26, whilst the page V not write-protected is provided from the virtual memory map 27.

To allow the page V to be determined immediately from the page U, for example, a difference between an address of the page U and an address of the page V may be taken as a constant C. At this time, the address of the page V can be found from V=(U+C).

Alternatively, the address of the page U may be relative to a base register X. At this time, the address of the page U is found from V=(U+C+X). Also, a hash table may be used to find the address of the page U with V=hash(U).

The page U and the page V are virtual pages, and have memory-mapped thereon the same real page. That is, the page V is different from the page U only in an access control attribute, and their contents are exactly identical to each other. Therefore, the page V functions as an alternative page of the page U.

Next, instruction rewriting when a write protection violation occurs will be described. First, WRITE(ADDR, VAL), which is a write instruction (host instruction) of a codelet P, is executed. The term "ADDR" as used herein refers to an address in the page U, and The term "VAL" as used herein refers to a write value.

When WRITE(ADDR, VAL) causes a write violation, the instruction rewriting unit 28*b* in the exception handler 28 code-replaces (program-rewrites) the store operation of the codelet P causing the write violation, replacing the store operation by CHECK_WRITE(ADDR, VAL) operation.

When CHECK_WRITE(ADDR, VAL) is executed, a corresponding address of the alternative page V is determined from the addresses ADDR, that is, the addresses in the page U. Then, a store instruction (WRITE command) specifying the determined address is generated. As explained above, the address of the page V can be found with V=(U+C), V(U+C+X), or the like. Therefore, in FIG. 5, OFFSET+ADDR is taken as the found address of the page V.

This WRITE((OFFSET+ADDR), VAL) indicates a virtual address space that is not page-protected and therefore is writable. Here, as required for actual write protection, the range write-protected by software is guarded from being written.

FIG. 6 is a schematic diagram for explaining a specific example of definition of CHECK_WRITE (ADDR, VAL). When the alternative page U not write-protected is provided for the argument ADDR of WRITE and a condition NOT PROTECTD_RANGE(ADDR) is satisfied, replacement with WRITE((OFFSET+ADDR), VAL) is performed.

On the other hand, when the alternative page U not write-protected is provided but the condition NOT PROTECTD_RANGE(ADDR) is not satisfied, replacement with WRITEX(ADDR, VAL) is performed. A WRITEX command has equivalent functions as a store instruction, but is different from the WRITE command in that the WRITEX command is not to be rewritten. That is, when execution of WRITEX causes a write protection violation, instruction rewriting as for WRITE is not performed. With this, the behavior upon write protection violation exception is the same as original (conventional exception handling). A distinction between WRITE and WRITEX will be explained further below.

The ninth row represents the case where a page other than U, which is found to be a write-protection target, is to be accessed. Since which page to be accessed is unknown before execution, as depicted in the twelfth row, WRITE(ADDR, VAL) is placed as it is. WRITE(ADDR, VAL) output as it is follows a policy for each normal (conventional) protected region, such as TLB entry replacement, and is a target for recursive rewrite. When this is not to be a target for recursive rewrite, replacement with WRITEX(ADDR, VAL) can be performed.

The replacement operation is logical, and can be implemented in various ways in consideration of a rewrite instruction length, such as taking CHECK_WRITE as a function call, directly causing in-line expansion, or causing development at another place via a trampoline code. Besides, in implementation, the replacement operation is performed in consideration of coherency of an instruction cache.

When WRITE(ADDR, VAL) causing a write protection violation is found, this may be immediately replaced with CHECK_WRITE(ADDR, VAL) in the exception handler 28, or may be omitted for the first some times and then be rewritten until later execution. In the case of immediate rewriting, execution is restarted from the second row.

The presence of the write-protected page U is recognized as a result of accessing there and causing an access protection violation. Embedding CHECK_WRITE is performed after such an access protection violation, and therefore U is taken as a constant (refer to the first row). On the other hand, in WRITE(ADDR, VAL) of the host instruction, ADDR is a variable determined at the time of execution, and can vary for each execution. In addition, PAGE( ) is suitably achieved by not a function but a macro such as a bit operation.

Next, with reference to FIGS. 7 and 8, occurrence of recursive rewrite will be described. In achieving a low-address protection function, the [0, 511] address range is specifically fixed in advance, and WRITE outside that range does not require recursive rewrite of the instruction. However, there is a possibility that one store instruction may cause a rewrite protection violation to a plurality of pages in different contexts. In such cases, recursive rewrite of the instruction occurs. FIGS. 7 and 8 are schematic diagrams for explaining a specific example when in-line development of recursive rewrite is performed at a place where the original WRITE (ADDR, VAL) is.

To access pages U1, U2, and U3 with the original WRITE (ADDR, VAL) being write-protected, first, when U1 is accessed and then U2 is accessed, WRITE(ADDR, VAL) described on the twelfth row of the code depicted in FIG. 6 causes a write protection violation on U2, resulting in the eighth to sixteenth rows in FIG. 7.

Next, WRITE(ADDR, VAL) described in the fifteenth row in FIG. 7 causes a write protection violation when U3 is accessed, resulting in the fifteenth to twenty-third rows in FIG. 8.

In this manner, when WRITE(U, VAL) is a target for recursive replacement, the code size may be linearly increased. To avoid this, it is preferable that the body portion of the function be extended with a function call of determining conditions of (PAGE(ADDR)==U) and PROTECTED_RANGE(ADDR), not with a simple address-range comparison operation.

In the example depicted in FIG. 8, a representation "PAGE (ADDR, Ux) . . . PROTECTED_RANGE(ADDR)" can be found on the first and second rows, the eighth and ninth rows, and the fifteenth and sixteenth rows. In practice, different processes are performed for PROTECTED_RANGE on the second, ninth, and sixteenth rows, because a different memory region is to be protected for each page Ux in the process of PROTECTED_RANGE.

If the determination of "PAGE(ADDR, Ux) . . . PROTECTED_RANGE(ADDR)" is changed, the code can be kept not increased. The definition of CHECK_WRITE in this case is depicted in FIG. 9.

In the example depicted in FIG. 9, it is checked whether ADDR is on a protected page by using a function or other on the first row. If ADDR is on a protected page, the process exits with WRIT(ADDR, VAL). With this, although the execution speed is decreased, versatile CHECK_WRITE avoiding an increase in code can be obtained.

Next, a distinction between WRITE and WRITEX will be described. As a method of making a distinction between WRITE and WRITEX, an arbitrary method can be taken based on a host-machine instruction set and implementation.

For example, if different types of store instructions are provided in the host machine, different store instructions can be allocated to WRITE and WRITEX, thereby making a distinction therebetween.

A table describing appearing positions of WRITE and WRITEX may be provided to each codelet, and a store instruction causing an exception at the head of CHECK_WRITE is determined to be WRITE or WRITEX.

Furthermore, immediately under each store instruction, a different type of No Operation (NOP) instruction may be placed (for example, a NOPa instruction for WRITE and a NOPb instruction for WRITEX) to determine the type of the store instruction.

The determining unit 28a depicted in FIG. 1 makes a distinction between WRITE and WRITEX by using the methods explained above or any other methods, and sends WRITE to the instruction rewriting unit 28b and WRITEX to the exception handling unit 28c.

Figure 10:
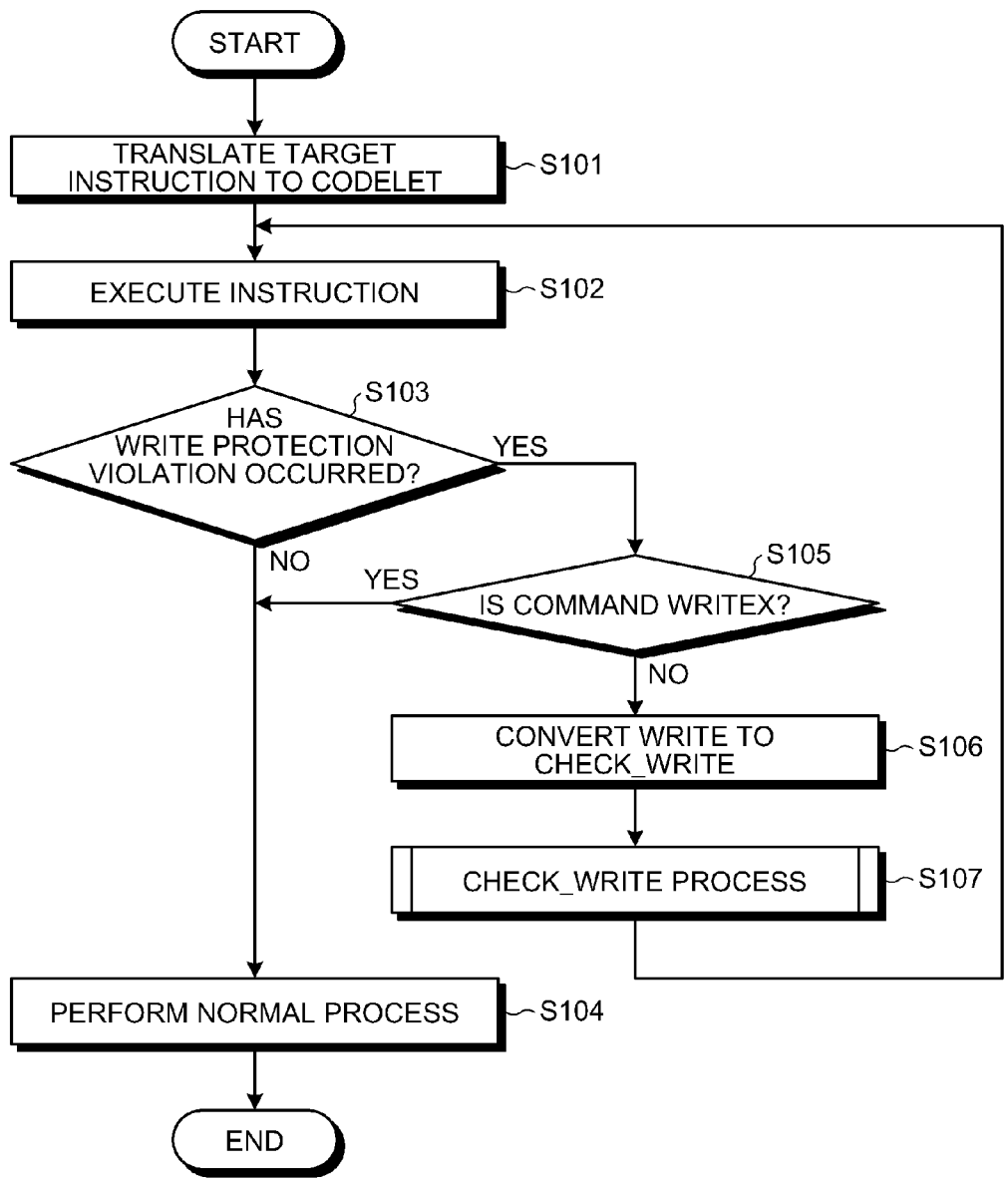
FIG. 10 is an example flowchart of a process of a codelet.

Next, with reference to FIG. 10, the process of the codelet in the emulation program 20 will be described. First, the instruction translating unit 22 in the emulation program 20 translates a target instruction output from the target program 10 to a codelet (Step S101).

The computing unit 23 executes the codelet (step S102). If no write protection violation has occurred by execution (No at Step S103), a normal process is performed (Step S104), and then the process ends.

On the other hand, if a write protection violation occurs (Yes at Step S103), the exception handler 28 is started. The determining unit 28a of the exception handler 28 determines whether the instruction causing a write protection violation is WRITEX or WRITE (Step S105).

When the instruction causing a write protection violation is WRITEX (Yes at Step S105), the normal process is performed (Step S104), that is, exception handling is performed by the exception handling unit 28c, and then the process ends.

On the other hand, when the instruction causing a write protection violation is WRITE (No at Step S105), the instruction rewriting unit 28b rewrites WRITE to CHECK_WRITE (Step S106).

Then, the computing unit 23 executes a CHECK_WRITE process (Step S107), and then returns to instruction execution (Step S102).

Figure 11:
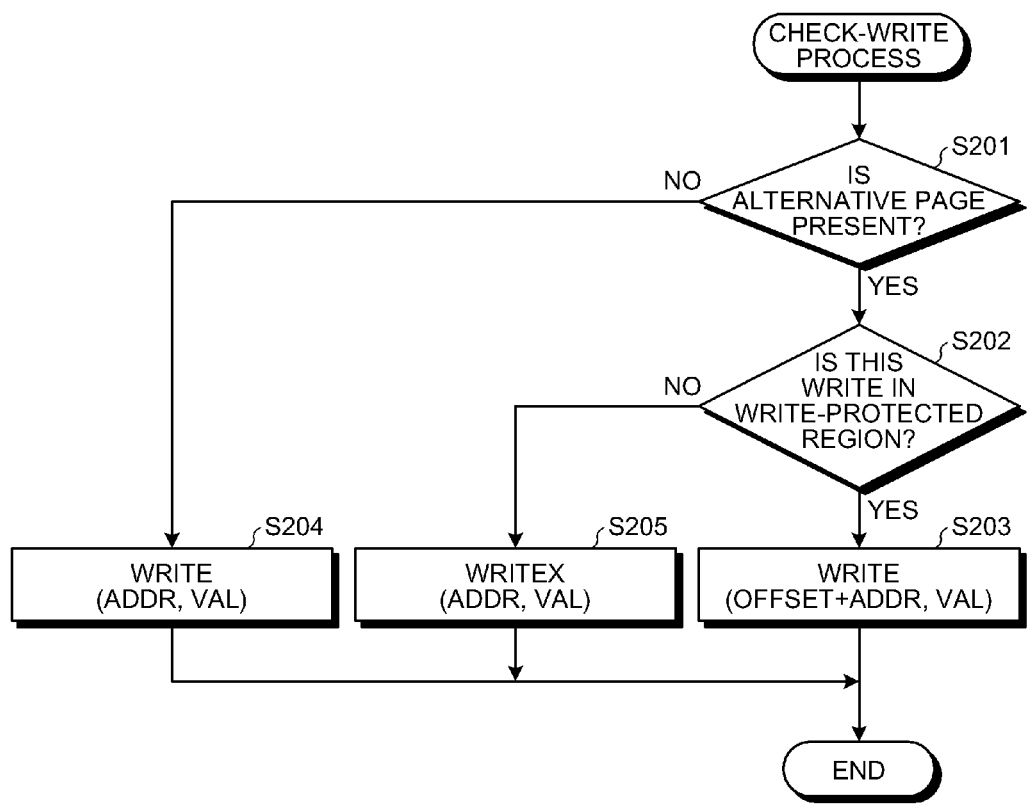
FIG. 11 is an example detailed flowchart of a CHECK_WRITE process depicted in FIG. 10.

Next, the CHECK_WRITE process is described in detail with reference to FIG. 11. As depicted in FIG. 11, in the CHECK_WRITE process, it is first determined whether an alternative page is present for a page of an access-destination (ADDR) (Step S201). When it is determined that no alternative page is present (No at Step S201), WRITE(ADDR, VAL) is output (Step S204), and then the CHECK_WRITE process ends.

On the other hand, when it is determined that an alternative page is present (Yes at Step S201), it is determined in the CHECK_WRITE process whether this write is in a write-protected region (Step S202). When it is determined that this write is not in a write-protected region (No at Step S202), WRITEX(ADDR, VAL) is output (Step S205), and then the CHECK_WRITE process ends.

When this write is in a write-protected region (Yes at Step S202), WRITE(OFFSET+ADDR, VAL) is output (Step S203), and then the CHECK_WRITE process ends.

In the foregoing, explanation is made to the store instruction translated to a codelet by the instruction translating unit 22. Next, a process on a store instruction interpreted by the instruction interpreting unit 21 (interpreter) will be described.

The store instruction interpreted by the instruction interpreting unit 21 causes an exception every time being written in a write-protected region, thereby possibly posing a problem of degradation in performance. However, generally speaking, in emulation software, a target instruction executed a number of times exceeding a threshold is automatically compiled into a codelet. Therefore, the presence of a store instruction in a bunch of target instructions executed a number of times below the threshold poses a problem.

In general, the bunch of target instructions as becoming a codelet takes a basic block as a unit of translatin. When a store instruction causes a memory protection violation, one basic block including that store instruction is determined at least. The basic block is an entry of control, and it is generally difficult to determine the entry of control by going back from the store instruction causing an exception.

Therefore, in the emulation program 20, a register or the like retaining an instruction address serving as an entrance of the current basic block as start point information is provided to the instruction interpreting unit 21. Then, when the store instruction interpreted and executed causes a memory protection violation, the start point information in the instruction interpreting unit 21 is referred to, and the basic block including the store instruction causing the violation is forcibly complied into a codelet.

Specifically, for an instruction that explicitly changes an instruction address register, such as a branching instruction, the instruction interpreting unit 21 sets a branching-destination instruction address in the start point information. Then, when a store instruction interpreted by the instruction interpreting unit 21 causes a write protection violation on a page related to low-address protection or the like, if the place is an originally writable place, the basic block including that store instruction is compiled by the instruction translating unit 22 from the start point information into a codelet, and the generated codelet is registered. Here, the procedures of registration, searching at the time of execution, execution, and discarding of the codelet are similar to those normally performed.

Figure 12:
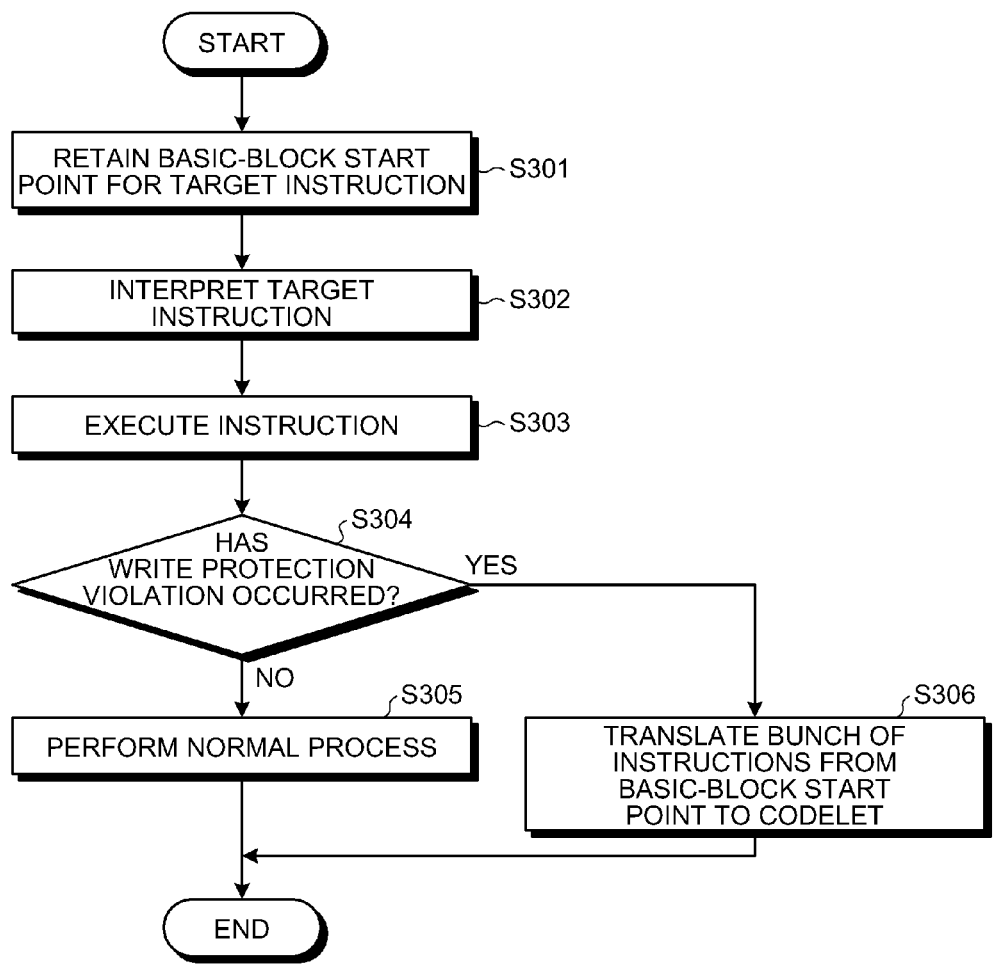
FIG. 12 is an example flowchart of a process of a store instruction.

FIG. 12 is a flowchart for explaining a process of a store instruction interpreted in the emulation program 20. First, for a target instruction output from the target program 10, the instruction interpreting unit 21 in the emulation program 20 retains a basic-block start point as start point information (Step S301).

Next, the instruction interpreting unit 21 interprets the target instruction (Step S302), and then executes the interpreted instruction (Step S303). If no write protection violation has occurred due to execution of the instruction (No at Step S304), a normal process is performed (Step S305), and then the process ends.

On the other hand, if a write protection violation has occurred (Yes at Step S304), the instruction translating unit 22 translates a block involving a store which causes the violation, starting from the basic-block start point to a codelet (Step S306), and then the process ends.

As has been explained above, according to the embodiment, dynamic instruction rewrite is performed on a codelet under memory write protection of the host machine 30. Therefore, by using a host-hardware's memory protecting function in units of pages, a memory region smaller than a one-page length can be protected while write can be achieved with practical performance in a memory region not requiring protection in the page.

That is, it is possible to achieve an efficient memory access, which suppresses the occurrence of memory protection violation, as well as to ensure necessary memory protection. Thus, both memory protection and high-speed access can be achieved.

Even when the protected region in the protected page is dynamically changed, this can be supported with dynamic instruction rewrite on a codelet.

The memory on the target machine is not changed (no instruction rewrite is performed). Therefore, no influence occurs because nothing is observed from the application and the target OS on the target machine.

Besides, instruction rewrite on a codelet is performed only when a memory write protection violation occurs at the time of execution of that codelet. Therefore, a portion where a memory write protection violation potentially occurs on a codelet not being executed is not a target for codelet rewrite.

Further, for an interpreter-executed store instruction causing a memory protection exception that is not rarely but not so frequently performed as being compiled by the instruction translating unit or the process causing latency until compiled, a bunch of target instructions including the store instruction is forcibly translated to a codelet. Thus, it is possible to achieve both memory protection and high-speed access.

According to an embodiment, memory protection can be performed in units smaller than memory protection units in a memory protection mechanism provided by the execution environment of the emulator, resulting in more efficient memory protection. Thus, it is possible to achieve both memory protection and high-speed access.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable storage medium storing thereon an emulation program for providing an execution environment of a target program, the emulation program causing a computer to perform:

translating an instruction output from the target program to an instruction executable in an execution environment of the emulation program;

generating, in a memory region for use by the target program, a first memory map which is write-protected in a first memory space based on the execution environment of the emulation program and a second memory map which is write-protected in a second memory space having a smaller memory length than the first memory space based on at least one of the execution environment of the target program and content of the instruction from the target program; and performing memory protection in the second memory space smaller than the first memory space in a memory protection mechanism provided by the execution environment of the emulation program by rewriting a first write instruction to the first memory map output at the translating to a second write instruction to the second memory map when the first write instruction causes a write protection violation to the first memory map, wherein the first memory space is a page of a predetermined range of memory addresses and the second memory space is a smaller range of memory addresses within the page, and since the first memory map is subjected to write protection in units of pages, a write protection mechanism works even in writing in data addresses on the same page that are not included in a sequence of target instructions, thereby causing a write protection violation, the performing includes, when a write destination on the second memory map is write-protected, rewriting the first write instruction to a write instruction proceeding to an exception handling at the time of a write violation, and the performing includes protecting the memory and suppressing occurrence of memory protection violation by rewriting an address of a store instruction causing a write violation to an address of the second memory map from an address of the first memory map.

2. The non-transitory computer-readable storage medium according to claim 1, wherein the second memory map has content identical to content of the first memory map and an address shifted from address of the first memory map by a predetermined amount.

3. The non-transitory computer-readable storage medium according to claim 1, wherein the rewriting includes, when the first write instruction causes a write protection violation to the first memory map and no second memory map corresponding to a write destination of the first write instruction is present, outputting the first write instruction.

4. The non-transitory computer-readable storage medium according to claim 1, the emulation program further causing the computer to perform interpreting the instruction output from the target program, wherein the translating includes, when a write instruction interpreted at the interpreting causes a write protection violation, translating a block of instructions including the write instruction.

5. The non-transitory computer-readable storage medium according to claim 4, wherein the interpreting includes, upon interpretation of the instruction output from the target program, generating start point information indicative of a start point of a range for translation at the translating.

6. An emulation apparatus for virtually providing an execution environment of a target program in a memory coupled to a microprocessor, the emulation apparatus comprising:

a translator that translates an instruction output from the target program to an instruction executable in an execution environment of the emulation apparatus, using the microprocessor;

a first memory map, in a memory region for use by the target program, that is write-protected in a first memory space based on the execution environment of the emulation apparatus, using the microprocessor;

a second memory map that is write-protected in a second memory space having a smaller memory length than the first memory space based on at least one of the execution environment of the target program and content of the instruction from the target program, using the microprocessor; and a performing unit comprising at least one processor that performs memory protection in the second memory space smaller than the first memory space in a memory protection mechanism provided by the execution environment of the emulation program by rewriting a first write instruction to the first memory map output from the translator to a second write instruction to the second memory map when the first write instruction causes a write protection violation to the first memory map, using the microprocessor, wherein the first memory space is a page of a predetermined range of memory addresses and the second memory space is a smaller range of memory addresses within the page, and since the first memory map is subjected to write protection in units of pages, a write protection mechanism works even in writing in data addresses on the same page that are not included in a sequence of target instructions, thereby causing a write protection violation, the performing unit rewrites, when a write destination on the second memory map is write-protected, the first write instruction to a write instruction proceeding to an exception handling at the time of a write violation, and the performing unit protects the memory and suppresses occurrence of memory protection violation by rewriting an address of a store instruction causing a write violation to an address of the second memory map from an address of the first memory map.

7. An emulation method for virtually providing an execution environment of a target program, the emulation method comprising:

translating an instruction output from the target program to an instruction executable in an execution environment of an emulation program;

generating, in a memory region for use by the target program, a first memory map which is write-protected in a first memory space based on the execution environment of the emulation program and a second memory map which is write-protected in a second memory space having a smaller memory length than the first memory space based on at least one of the execution environment of the target program and content of the instruction from the target program; and performing memory protection in the second memory space smaller than the first memory space in a memory protection mechanism provided by the execution environment of the emulation program by rewriting a first write instruction to the first memory map output at the translating to a second write instruction to the second memory map when the first write instruction causes a write protection violation to the first memory map, wherein the first memory space is a page of a predetermined range of memory addresses and the second memory space is a smaller range of memory addresses within the page, and since the first memory map is subjected to write protection in units of pages, a write protection mechanism works even in writing in data addresses on the same page that are not included in a sequence of target instructions, thereby causing a write protection violation, the performing includes, when a write destination on the second memory map is write-protected, rewriting the first write instruction to a write instruction proceeding to an exception handling at the time of a write violation, and the performing includes protecting the memory and suppressing occurrence of memory protection violation by rewriting an address of a store instruction causing a write violation to an address of the second memory map from an address of the first memory map.

* * * * *

UNITED STATES PATENT AND TRADEMARK OFFICE
CERTIFICATE OF CORRECTION

PATENT NO. : 8,543,371 B2  
APPLICATION NO. : 12/409136  
DATED : September 24, 2013  
INVENTOR(S) : Maeda Page 1 of 1

It is certified that error appears in the above-identified patent and that said Letters Patent is hereby corrected as shown below:

On the Title Page, Item (54) and in the Specification, Column 1, line 3:

In the title, insert --METHOD IN AN EMULATION-- before "ENVIRONMENT".

Signed and Sealed this  
Tenth Day of June, 2014

Michelle K. Lee  
*Deputy Director of the United States Patent and Trademark Office*